United States Patent
Cameno Salinas et al.

(10) Patent No.: US 10,052,880 B2
(45) Date of Patent: Aug. 21, 2018

(54) VALVES FOR PRINTING FLUID SUPPLY SYSTEMS

(71) Applicant: HEWLETT-PACKARD DEVELOPMENT COMPANY, L.P., Houston, TX (US)

(72) Inventors: Alfonso Cameno Salinas, Barcelona (ES); Joaquim Brugue Garvi, Barcelona (ES); Jose Antonio Lopez Abancens, Sant Cugat del Valles (ES); Rafael Ulacia Portoles, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/542,430

(22) PCT Filed: Jan. 30, 2015

(86) PCT No.: PCT/US2015/013815
§ 371 (c)(1),
(2) Date: Jul. 9, 2017

(87) PCT Pub. No.: WO2016/122609
PCT Pub. Date: Aug. 4, 2016

(65) Prior Publication Data
US 2017/0368834 A1    Dec. 28, 2017

(51) Int. Cl.
*B41J 2/175* (2006.01)
*F16K 7/17* (2006.01)
(Continued)

(52) U.S. Cl.
CPC ....... *B41J 2/17596* (2013.01); *B41J 2/17553* (2013.01); *F16K 7/17* (2013.01); *F16K 15/147* (2013.01); *F16K 31/1262* (2013.01)

(58) Field of Classification Search
CPC .... B41J 2/175; B41J 2/17596; B41J 2/17556; F16K 27/065; F16K 31/445
See application file for complete search history.

(56) References Cited

U.S. PATENT DOCUMENTS 4,527,175 A * 7/1985 Kojima .................... B41J 2/175
                                                    347/85
4,858,127 A * 8/1989 Kron ...................... G01N 11/00
                                                    73/54.09
(Continued)

FOREIGN PATENT DOCUMENTS

| CN | 101287606 | 10/2008 |
| CN | 103561957 | 2/2014 |
| WO | WO-2009139771 | 11/2009 |

*Primary Examiner* — John P Zimmermann
(74) *Attorney, Agent, or Firm* — HP Inc. Patent Department (57) ABSTRACT

In an example, a valve for a printing fluid supply system is disclosed. In this example, the valve includes two rigid shells to provide connections to a first printing fluid supply cartridge, a second printing fluid supply cartridge and a printhead. Further, the valve includes a diaphragm with sealing elements disposed between the two rigid shells to selectively couple one of the first printing fluid supply cartridge and the second printing fluid supply cartridge to the printhead and seal other printing fluid supply cartridge using the sealing elements.

20 Claims, 12 Drawing Sheets

(51) Int. Cl.
*F16K 15/14* (2006.01)
*F16K 31/126* (2006.01)

(56) References Cited

U.S. PATENT DOCUMENTS

| | | | |
|---|---|---|---|
| 4,937,598 | A | 6/1990 | Hine et al. |
| 4,988,077 | A * | 1/1991 | Conley .................. F16K 5/045 |
| | | | 251/309 |
| 6,206,511 | B1 | 3/2001 | Cook et al. |
| 6,209,997 | B1 | 4/2001 | Duong et al. |
| 6,945,640 | B2 | 9/2005 | Cheok |
| 7,025,445 | B2 | 4/2006 | Thiekman et al. |
| 7,192,110 | B2 | 3/2007 | Taguchi et al. |
| 7,401,907 | B2 | 7/2008 | Perez |
| 8,113,612 | B2 | 2/2012 | Levy et al. |
| 9,175,779 | B2 * | 11/2015 | Watanabe ................. F16K 7/12 |
| 2004/0012655 | A1 | 1/2004 | Thielman |
| 2007/0103521 | A1 | 5/2007 | Nip |
| 2009/0315927 | A1 * | 12/2009 | Uehara ................... B41J 2/175 |
| | | | 347/7 |
| 2010/0220127 | A1 | 9/2010 | Levy |
| 2011/0063346 | A1 | 3/2011 | Lewis |
| 2011/0228017 | A1 | 9/2011 | Dyer et al. |
| 2014/0022318 | A1 | 1/2014 | Cameno et al. |
| 2015/0270794 | A1 * | 9/2015 | Bauer ....................... H02P 1/16 |
| | | | 318/430 |

* cited by examiner

VALVES FOR PRINTING FLUID SUPPLY SYSTEMS

BACKGROUND

Generally, printing fluid supply systems of a printer include a printing fluid supply cartridge that may be designed to deliver printing fluid to a printhead. The printing fluid supply systems may use pressurized air to pump the printing fluid from the printing fluid supply cartridge to the printhead. Alternatively, some printing fluid supply systems may include two printing fluid supply cartridges of the same printing fluid type (e.g., two printing fluid supply cartridges for each color connected via a common pipe to the printhead) to enable replacement of a printing fluid supply cartridge without having to interrupt or pause an operation (e.g., printing). In such a dual printing fluid supply cartridge scenario, it may be useful to block flow of printing fluid from an active printing fluid supply cartridge (i.e., the one delivering the printing fluid to the printhead) to the passive one, that is not delivering the printing fluid to the printhead, to avoid any undesirable refilling between the two printing fluid supply cartridges due to the printhead being located at the end of the common pipe.

BRIEF DESCRIPTION OF THE DRAWINGS

Examples of the disclosure are now be described in detail with reference to the accompanying drawings, in which.

DETAILED DESCRIPTION

In the following detailed description of the examples of the present subject matter, references are made to the accompanying drawings that form a part hereof, and in which are shown by way of illustration specific in which the present subject matter may be practiced. These examples are described in sufficient detail to enable those skilled in the art to practice the present subject matter, and it is to be understood that other examples may be utilized and that changes may be made without departing from the scope of the present subject matter. The following detailed description is, therefore, not to be taken in a limiting sense, and the scope of the present subject matter is defined by the appended claims.

Generally, in a printing fluid supply system of a printer (e.g., a dual cartridge ink delivery system of an inkjet printer), a selected one of printing fluid supply cartridges is fluidly coupled to a pressurized air source and may provide printing fluid to a printhead while the other cartridge remains unpressurized or depressurized. In this scenario, each printing fluid supply cartridge may have an associated check valve to fluidly decouple the associated printing fluid supply cartridge from the printhead when the associated printing fluid supply cartridge is unpressurized or depressurized. Also, a check valve may ensure that an associated pressurized printing fluid supply cartridge does not cause printing fluid to flow from the pressurized printing fluid supply cartridge into a depressurized or unpressurized printing fluid supply cartridge. However, printing fluid may spill during printhead removal when remnant pressure in fluid pipes is positive. Also, air may ingest inside the printhead during removal of the printhead when the remnant pressure in the fluid pipes is negative.

To address these issues, an example printing fluid supply system of printers disclosed herein includes a source of pressurized air that may be shared by multiple printing fluid supply cartridges (e.g., ink cartridges). Example printers include large format printers, three dimensional (3D) printers and the like. The source of pressurized air may be selectively coupled to the printing fluid supply cartridges via a selection valve. By controlling a position of the selection valve, a selected one of the printing fluid supply cartridges is coupled to the source of pressurized air and, thus, provides printing fluid to a printhead while other printing fluid supply cartridge remains unpressurized. Further, the printing fluid supply system includes a valve between the printing fluid supply cartridges of same fluid type or color that may avoid backflow of the printing fluid between the printing fluid supply cartridges. Furthermore, the valve may regulate the pressure in a printhead fluid inlet when the printhead is removed. For example, the valve may be a three-way, two-position mechanical valve. In an example, the valve may include two rigid shells for providing connections to the printing fluid supply cartridges and the printhead. Also, the valve may include a diaphragm with sealing elements disposed between the two rigid shells for selectively coupling the one of printing fluid supply cartridges that is pressurized to the printhead and for sealing the other printing fluid supply cartridge that is unpressurized or depressurized using the sealing elements. This type of valve is of low cost and compact size.

While the examples described herein refer, for ease of discussion, to printing fluid supply systems for a printer, the example disclosed herein may, additionally or alternatively, be used to implement any number and/or type(s) of printing fluid supply and/or administration system(s). Moreover, while this disclosure refers to printing fluids, it will be understood that the examples described herein may be used to supply any number and/or type(s) of printing fluid(s) and/or liquid(s) such as a non-compressible low viscosity liquid, such as an ink.

Figure 1:
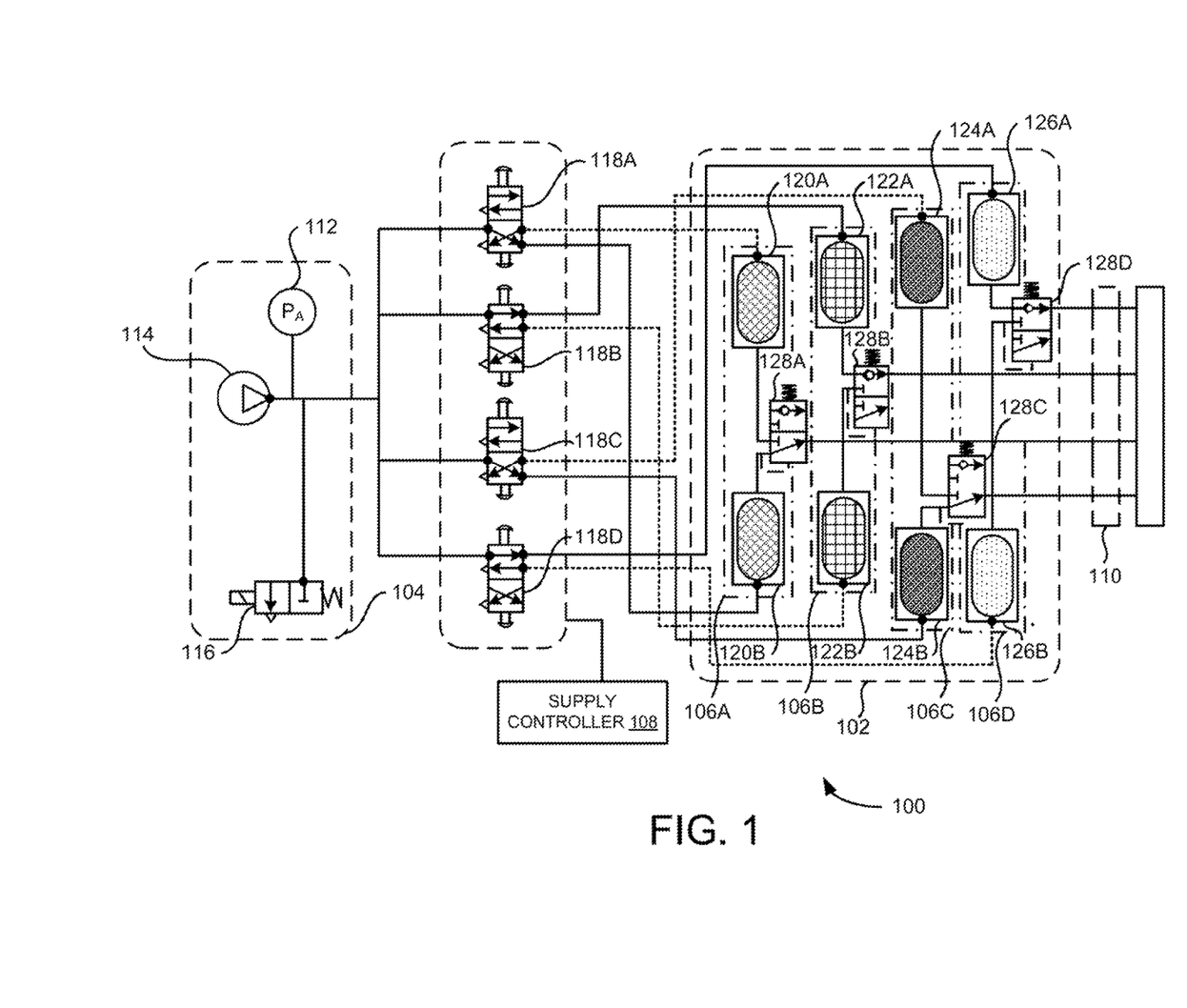
FIG. 1 is a schematic illustration of an example printing fluid supply system.

FIG. 1 is a schematic illustration of an example printing fluid supply system 100. To provide printing fluid to a printhead, the printing fluid supply system 100 may include a dual cartridge printing fluid supply station 102 and an air pressurization system 104. Further, the dual cartridge printing fluid supply station 102 may include printing fluid supply assemblies 106A-D having two printing fluid supply cartridges. In the example illustrated in FIG. 1, the printing fluid supply assembly 106A includes printing fluid supply cartridges 120A and 120B, the printing fluid supply assembly 106B includes printing fluid supply cartridges 122A and 122B, the printing fluid supply assembly 106C includes printing fluid supply cartridges 124A and 124B and the printing fluid supply assembly 106D includes printing fluid supply cartridges 126A and 126B. In an example, each of the printing fluid supply assemblies 106A-D may be associated with a different color, or different type, of printing fluid. In this example, the printing fluid supply cartridges 120A and 120B may provide yellow printing fluid, the printing fluid supply cartridges 122A and 122B may provide magenta printing fluid, the printing fluid supply cartridges 124A and 124B may provide cyan printing fluid and the printing fluid supply cartridges 126A and 126B may provide black printing fluid. While each of the printing fluid supply assemblies 106A-D of FIG. 1 supporting two printing fluid supply cartridges 120A-B, 122A-B, 124A-B and 126A-B, respectively, each of the printing fluid supply assemblies 106A-D may be implemented to support any other number of printing fluid supply cartridges (e.g., three).

Furthermore, the printing fluid supply assemblies 106A-D may include any number and/or type(s) of connectors and/or conductors (not shown) that electrically and/or communicatively couple the printing fluid supply cartridges 120A-B, 122A-B, 124A-B and 126A-B to a supply controller 108 and/or other devices of a printer. For example, the connectors and/or conductors can be used by the supply controller 108 to obtain fluid level information from the printing fluid supply cartridges 120A-B, 122A-B, 124A-B and 126A-B and/or to determine which of the printing fluid supply cartridges 120A-B, 122A-B, 124A-B and 126A-B are currently installed.

In addition, the air pressurization system 104 may include a source of pressurized air 114, a pressure sensor 112 and a pressure relief valve 116. An example source of pressurized air 114 is any type of air pump and/or air pumping device. In an example implementation, the source of pressurized air 114 may be controlled using the pressure sensor 112 and the pressure relief valve 116. In the example illustrated in FIG. 1, the source of pressurized air 114 is shared by the printing fluid supply assemblies 106A-D and the printing fluid supply cartridges 120A-B, 122A-B, 124A-B and 126A-B within the printing fluid supply assemblies 106A-D, respectively. Using any number and/or type(s) of method(s) and/or logic(s), the pressure of the air generated and/or provided by the example source of pressurized air 114 may be maintained, adjusted and/or controlled to ensure a consistent and/or adequate flow of printing fluid from the printing fluid supply assemblies 106A-D to the printhead. When, for example, a printer including the example printing fluid supply system 100 is powered off and/or to facilitate maintenance, the printing fluid supply system 100 can be depressurized by opening the pressure relief valve 116.

Moreover, the printing fluid supply assemblies 106A-D are coupled to the source of pressurized air 114 via respective ways or ports of selection valves 18A-D. In an example, each of the selection valves 118A-D includes four ways or ports for the source of pressurized air 114, air inlets of printing fluid supply cartridges and the atmosphere. In the example illustrated in FIG. 1, the printing fluid supply cartridges 120B, 122A, 124B and 126A are coupled to the source of pressurized air 114 via the selection valves 118A-D, respectively. In this example, the respective one of the selection valves 118A-D selectively couple the source of pressurized air 114 to the printing fluid supply cartridges 120B, 122A, 124B and 126A to provide printing fluid to the printhead via fluid pipes 110 and the printing fluid supply cartridges 120A, 122B, 124A and 126B to the atmosphere in order to be removed or replaced for maintenance or service. In an example implementation, the selection valves 118A-D may selectively couple the printing fluid supply cartridges 120A-B, 122A-B, 124A-B and 126A-B, respectively, to the source of pressurized air 114 based on the fluid level information obtained by the supply controller 108. For example, the source of pressurized air 114 and the selection valves 118A-D of FIG. 1 are selected based on, for example, flow rate(s), pressure(s), pump curve and/or effective relief area conditions. Also, the printing fluid supply system 100 includes valves 128A-D between the printing fluid supply cartridges 120A-B, 122A-B, 124A-B and 126A-B, respectively, to avoid backflow of the printing fluid between the printing fluid supply cartridges 120A-B, 122A-B, 124A-B and 126A-B and to regulate pressure in a printhead fluid inlet when the printhead is removed. Example pressure map and pressurization cycles are shown in FIG. 6 and FIGS. 7-9, respectively.

In an example implementation, when the selection valve 118A couples the printing fluid supply cartridge 120A to the source of pressurized air 114 (i.e., a first position), the printing fluid supply cartridge 120A may become pressurized causing the printing fluid to flow from the printing fluid supply cartridge 120A to the printhead. In this first position, the printing fluid supply cartridge 120B is fluidly decoupled from the source of pressurized air 114 (i.e., vented to the atmosphere) and, thus, remains depressurized or unpressurized in order to be removed or replaced for maintenance or service. When the selection valve 118A is in a second position where the printing fluid supply cartridge 120B is fluidly coupled to the source of pressurized air 114, the printing fluid supply cartridge 120B is pressurized causing printing fluid to flow from the printing fluid supply cartridge 120B to the printhead. In this second position, the printing fluid supply cartridge 120A is fluidly decoupled from the source of pressurized air 114 (i.e., vented to the atmosphere) and, thus, remains depressurized. Accordingly, one of the printing fluid supply cartridges 120A and 120B is pressurized at a time.

Even though the depressurization of one of the printing fluid supply cartridges 120A and 120B happens while the other printing fluid supply cartridge 120A and 120B is being pressurized causing the pressure curves of the printing fluid supply cartridges 120A and 120B to cross at a point of low pressure, such a cross-over does not represent a condition where more than one of the printing fluid supply cartridges 120A and 120B is pressurized to a pressure sufficient to cause the printing fluid to flow. The example selection valve 118A of FIG. 1 is mechanically stable in the first and second positions. As the selection valve 118A is moved from the first position to the second position, pressure in an output through the printhead decrease during a particular time to increase the pressure again when the valve 128A changes a position of a diaphragm which is described below.

Also, to prevent the printing fluid from flowing between the printing fluid supply cartridges 120A and 120B, the printing fluid supply system 100 may include the valve 128A. When the example selection valve 118A is positioned to pressurize the printing fluid supply cartridge 120A, the valve 128A may fluidly couple the printing fluid supply cartridge 120A to the printhead for allowing the printing fluid to flow via the fluid pipes 110 and fluidly decouple the printing fluid supply cartridge 120B from the printhead (i.e., a first position 206 shown in FIG. 2) by coupling the printing fluid supply cartridge 120B to a closed end inside the valve 128A. When the selection valve 118A is positioned to pressurize the printing fluid supply cartridge 120B, the valve 128A may fluidly decouple the printing fluid supply cartridge 120A from the printhead by coupling to the closed end (i.e., sealing elements 408 of FIG. 4) inside the valve 128A and fluidly couple the printing fluid supply cartridge 120B to the printhead (i.e., a second position 208 shown in FIG. 2). Thereby, allowing a pressurized printing fluid supply cartridge being unintentionally fill a depressurized or unpressurized printing fluid supply cartridge. The example valve 128A may also ensure that the printing fluid supply cartridge 120A and 120B having the greater fluid pressure is the printing fluid supply cartridge 120A and 120B supplying printing fluid to the printhead. The crack pressure of the example valve 128A and/or the prevention of internal leaks may affect the method(s) or logic(s) used to determine when to switch printing fluid supply cartridge 120A and 120B and/or operational limits. The working schematics of an example valve (any of the valves 128A-D) are explained in more detail with reference to FIG. 2. Example components of a valve are shown in FIG. 3.

In an example, the printing fluid supply system 100 may include interfaces, controllers, elements and/or devices instead of, or in addition to, those illustrated in FIG. 1 and/or may include more than one of any or all of the illustrated interfaces, controllers, elements and/or devices. Further, the example supply controller 108 may be implemented by circuit(s), programmable processor(s), fuses, application-specific integrated circuit(s) (ASIC(s)), programmable logic device(s) (PLD(s)), field programmable logic device(s) (FPLD(s)), and/or field-programmable gate array(s) (FPGA(s)), and the like.

Figure 2:
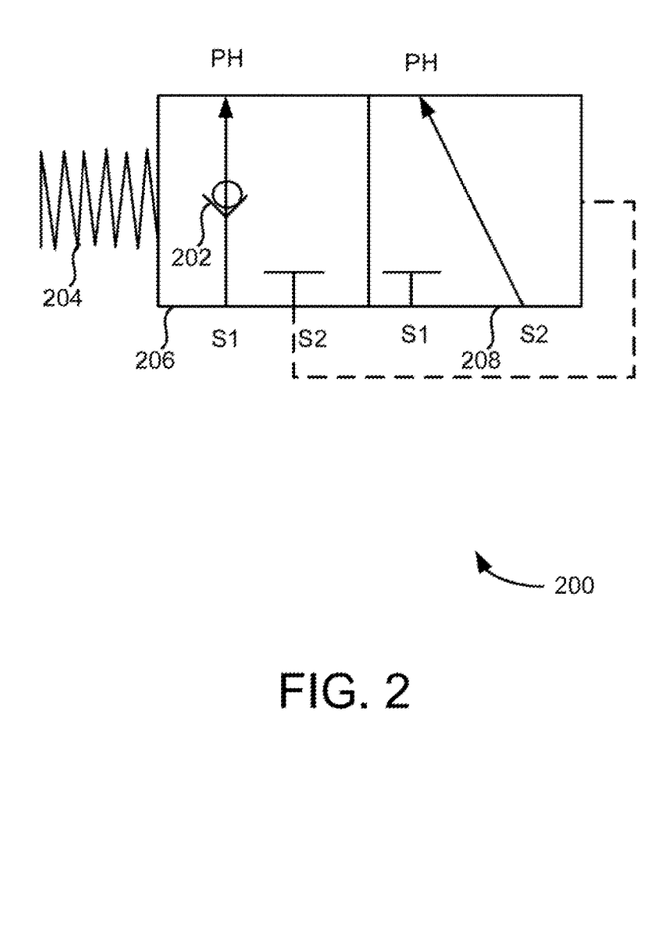
FIG. 2 is a sketch of working schematics of an example valve in the printing fluid supply system, such as shown in FIG. 1.

Referring now to FIG. 2, which is a sketch of working schematics of an example valve 200 (e.g., any one of the valves 128A-D such as shown in FIG. 1). For example, the valve 200 may be a 3-way 2-position valve, self-piloted by pressure in one of inlets, and with return to normal position by means of a spring 204. As shown in FIG. 2, S1 and S2 are connection inlets to printing fluid supply cartridges (e.g., any of the printing fluid supply cartridges 120A-B, 122A-B, 124A-B or 126A-B of FIG. 1) and PH is a connection outlet to a printhead. In an example when S1 is pressurized, PH is coupled to S1 with a uni-directional membrane check valve 202 and S2 is coupled to a closed end (i.e., sealing elements 408 shown in FIG. 4) inside the valve 200 (a first position 206). In this example, S1 delivers the printing fluid to the printhead when the printhead demands the printing fluid. In some scenarios, if S1 is depressurized, the pressure in the printhead inlet (PH) remains high because of the internal membrane check valve 202. In another example, when a certain pressure is applied to S2 (i.e., a crack pressure), the valve 200 changes to a second position 208 in which S1 is coupled to the closed end inside the valve 200 and S2 is coupled to PH and delivers the printing fluid to the printhead. In this case when the pressure in S2 reliefs, then the valve 200 reverts back to the first position 206, but a residual pressure in PH may include certain pressure close and linked to the crack pressure. Example components of the valve 200 are shown in FIG. 3.

Figure 3:
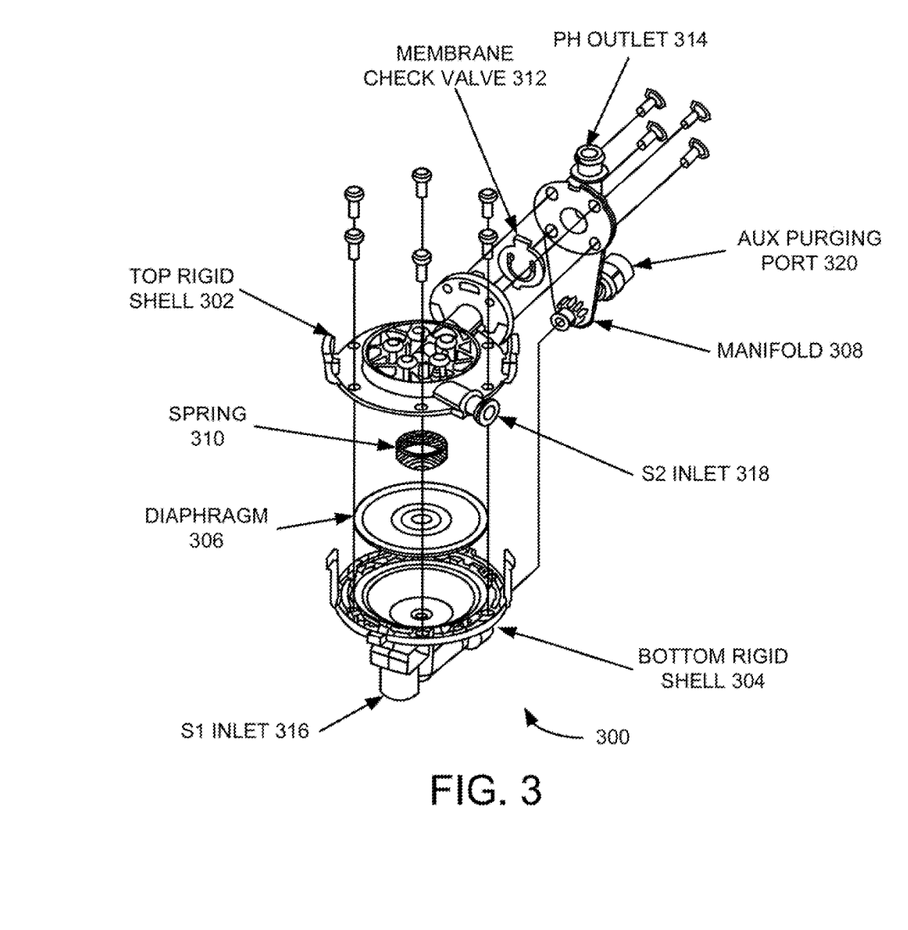
FIG. 3 is a schematic illustration of an example valve in the printing fluid supply system, such as shown in FIG. 1.

Referring now to FIG. 3, which is a schematic illustration of an example valve 300 in a printing fluid supply system (e.g., any one of the valves 128A-D in the printing fluid supply system 100 such as shown in FIG. 1). As shown in FIG. 3, the valve 300 includes a top rigid shell 302, a bottom rigid shell 304, a diaphragm 306, a manifold 308, a spring 310, a membrane check valve 312, a PH outlet 314, a S1 inlet 316, a S2 inlet 318, and an auxiliary purging port 320.

Figure 4:
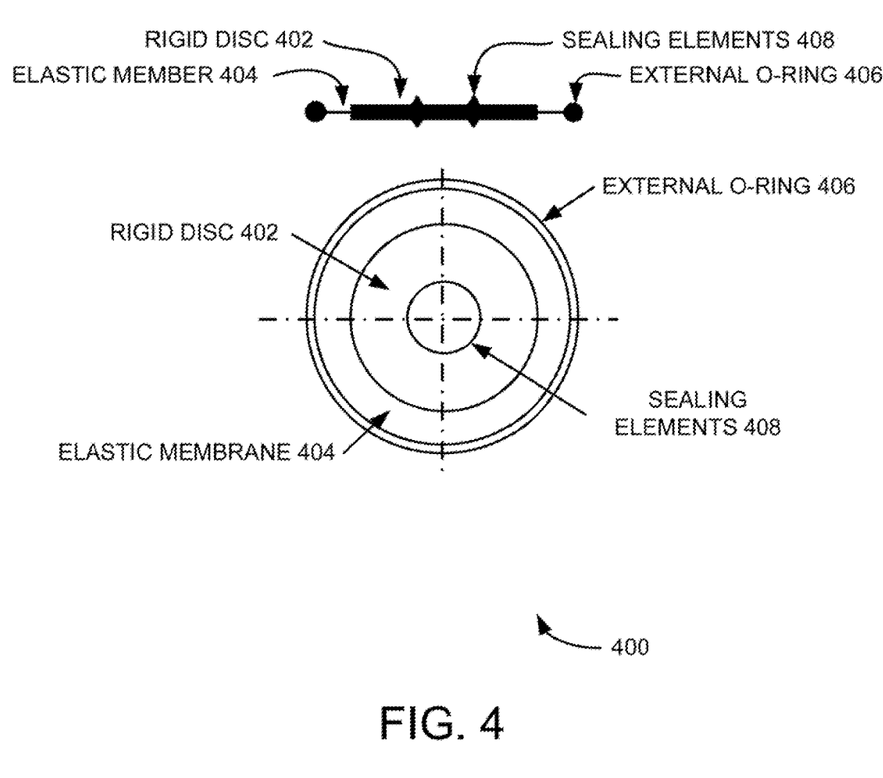
FIG. 4 is a schematic illustration of an example diaphragm in the valve, such as shown in FIG. 3.

In an example, the diaphragm 306 (e.g., a rubber membrane and the like) is of a shape like disc, as shown in a schematic illustration 400 of FIG. 4, with sealing elements 408 on both sides in a center, at a certain radius. In an external perimeter, the diaphragm 306 includes an external o-ring or another sealing element 406, which seals printing fluid from exterior. In this example, an area closed by the sealing elements 408 is Ab and an area of crown between the external o-ring 406 and the sealing elements 408 is Aa. Further, the diaphragm 306 includes a rigid disc 402 and an elastic membrane 404.

Furthermore, the top rigid shell 302 and the bottom rigid shell 304 (two rigid shells) hold the diaphragm 306 and provides connections to a first printing fluid supply cartridge, a second printing fluid supply cartridge and a printhead via the S1 inlet 316, the S2 inlet 318 and the PH outlet 314, respectively. In an example, the diaphragm 306 selectively couples one of first and second printing fluid supply cartridges that is pressurized to the printhead and seals other printing fluid supply cartridge that is depressurized or unpressurized using the sealing elements 408, in the printing fluid supply system. In this example, the diaphragm 306 blocks printing fluid from the other printing fluid supply cartridge using the sealing elements 408 that seals the other printing fluid supply cartridge.

Also, the manifold 308 (a third rigid shell) makes inner interconnections inside the valve 300 and provides a housing for the membrane check valve 312. In addition, the spring 310 (or a group of springs) applies a certain force upon a rigid portion (i.e., the rigid disc 402) of the diaphragm 306 such that the diaphragm 306 seals the one of the first and second printing fluid supply cartridges using the sealing elements 408 and couples the other printing fluid supply cartridge to the printhead when the other printing fluid supply cartridge is pressurized. Further, the spring 310 applies a force upon the diaphragm 306 such that the diaphragm 306 seals the other printing fluid supply cartridge using the sealing elements 408 and maintains a residual pressure at the PH outlet 314 when the other printing fluid supply cartridge is depressurized.

Figure 5:
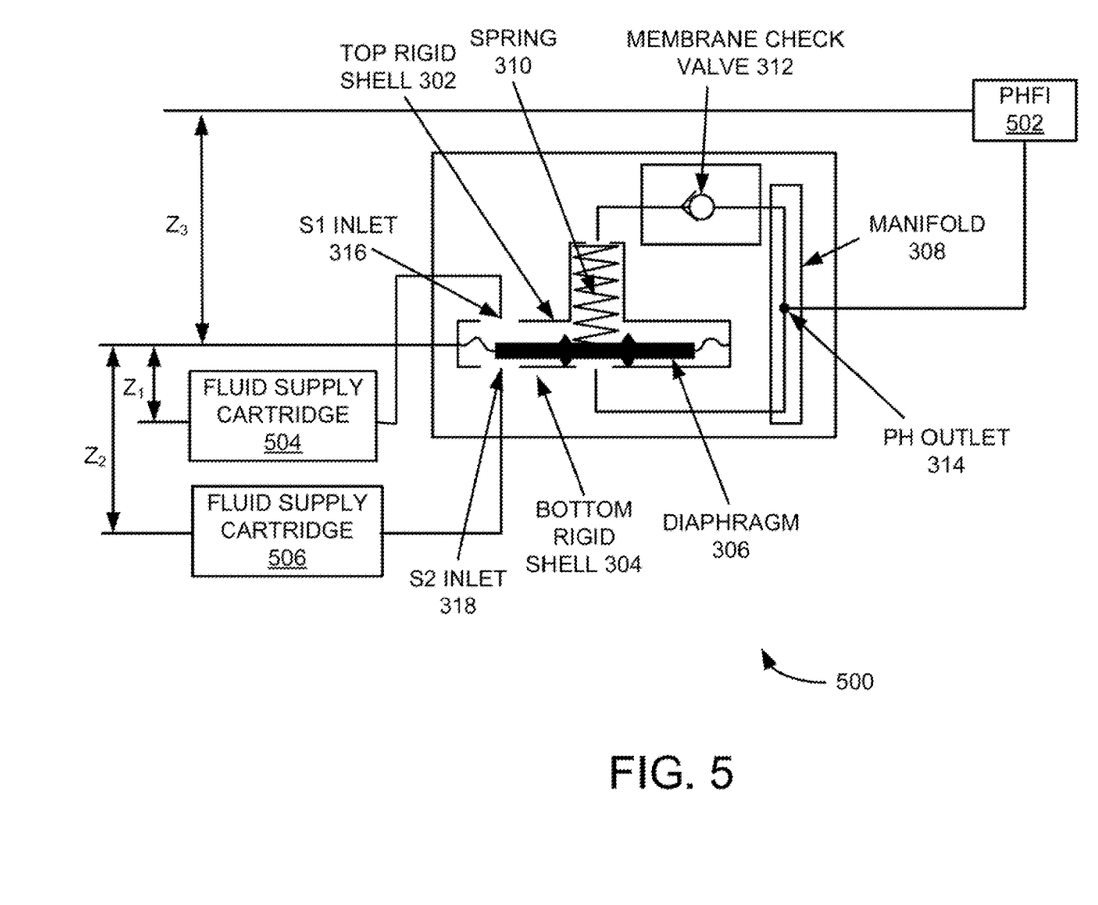
FIG. 5 is a sketch of constructive schematics of an example valve, such as shown in FIG. 3.

Moreover, the membrane check valve 312, which may be a rudimentary reed valve, housed in between the top rigid shell 302 and the manifold 308 to maintain pressure in the PH outlet 314 when the one of first and second printing fluid supply cartridges is depressurized. In addition, the auxiliary purging port 320 is connected to a purge port that is used to connect purgers to eliminate air in the printing fluid supply system. The air is eliminated by eliminating the air in a branch that goes from the one of first and second printing fluid supply cartridges to the printhead and then eliminating the air in a branch that goes from the other printing fluid supply cartridge to the purge port. Example constructive schematics of the valve 300 and a relative position of the valve 300 in an inkjet printer are shown in a sketch 500 of FIG. 5. Particularly, relative heights (e.g., Z1, Z2 and Z3) of a first printing fluid supply cartridge 504, a second printing fluid supply cartridge 506, a printhead fluid interconnect (PHFI) 502 with respect to the valve 300 are shown in the sketch 500 of FIG. 5.

Figure 6:
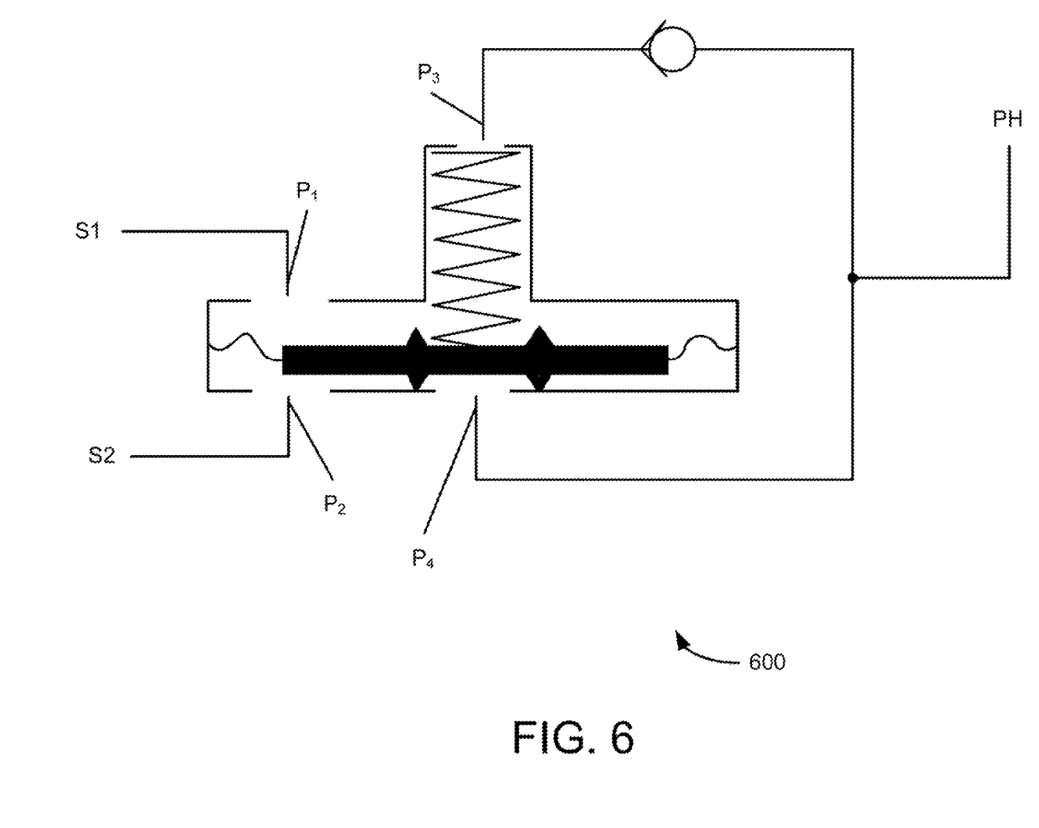
FIG. 6 is a schematic illustration of a pressure map of an example valve, such as shown in FIGS. 1 and 3.

Referring now to FIG. 6, which is a schematic illustration of a pressure map of an example valve 600, such as shown in FIGS. 1 and 3. As shown in FIG. 6, pressures in different parts of the valve are represented as P1, P2, P3 and P4. In an example, the pressure on both sides of a diaphragm (e.g., the diaphragm 306 shown in FIG. 3) depends on, for air pressure ink delivery systems, pressure of air in an active printing fluid supply cartridge, transference of pressure between the air in a printing fluid supply cartridge bottle and printing fluid inside a printing fluid supply cartridge bag (i.e., a ratio air pressure/ink pressure is close to one when the printing fluid supply cartridge has 20% or more of the printing fluid capacity, but decreases rapidly with getting closer to run out of the printing fluid), a fluid level inside the active printing fluid supply cartridge and relative heights of printing fluid supply cartridges and a printhead with respect to the valve (e.g., Z1, Z2 and Z3 as shown in the sketch 500 of FIG. 5). In this example, if P1 is greater than or equal to P2, then an outlet at P3 (i.e., S1 316 shown in FIG. 3) is open. If P2 is greater than P1, then an outlet at P4 (i.e., S2 318 shown in FIG. 3) is open. When P2 falls below a certain level with respect to P1, a spring (e.g., the spring 310 of FIG. 3) closes the outlet at P4 and, while a check valve (e.g., the check valve 312 of FIG. 3) is closed, the PH is equal to P4 when a transition happened. To reach a certain target pressure in a connection port or outlet to the printhead (i.e., PH 314 shown in FIG. 3), the valve leaves a residual pressure (Pres).

In another example, a balance of forces on the diaphragm is represented using a below equation:

$$P1.Aa + P3.Ab + Fm + Fs1 = P2.Aa + P4.Ab + Fs2$$

where,
Fm is a force of the spring,
Fs1 is a sealing force of the sealing elements 408 from S1 side against a top rigid shell (e.g., the top rigid shell 302 of FIG. 3), and
Fs2 is a sealing force of the sealing elements 408 from S2 side against a bottom rigid shell (e.g., the bottom rigid shell 304 of FIG. 3).

The above equation is met in a quasi-static or stationary process, where acceleration of moving masses is disregarded. In this equation, if the diaphragm is sealing at S2 side, then Fs1 is zero and if the diaphragm is sealing at S1 side, then Fs2 is zero. The Fs1 and Fs2 can also be considered as springs whose deformation is proportional (linear or not) to the forces. Subsequently, there is a deformation in the sealing elements that can modify the force made by the spring.

Figure 7A:
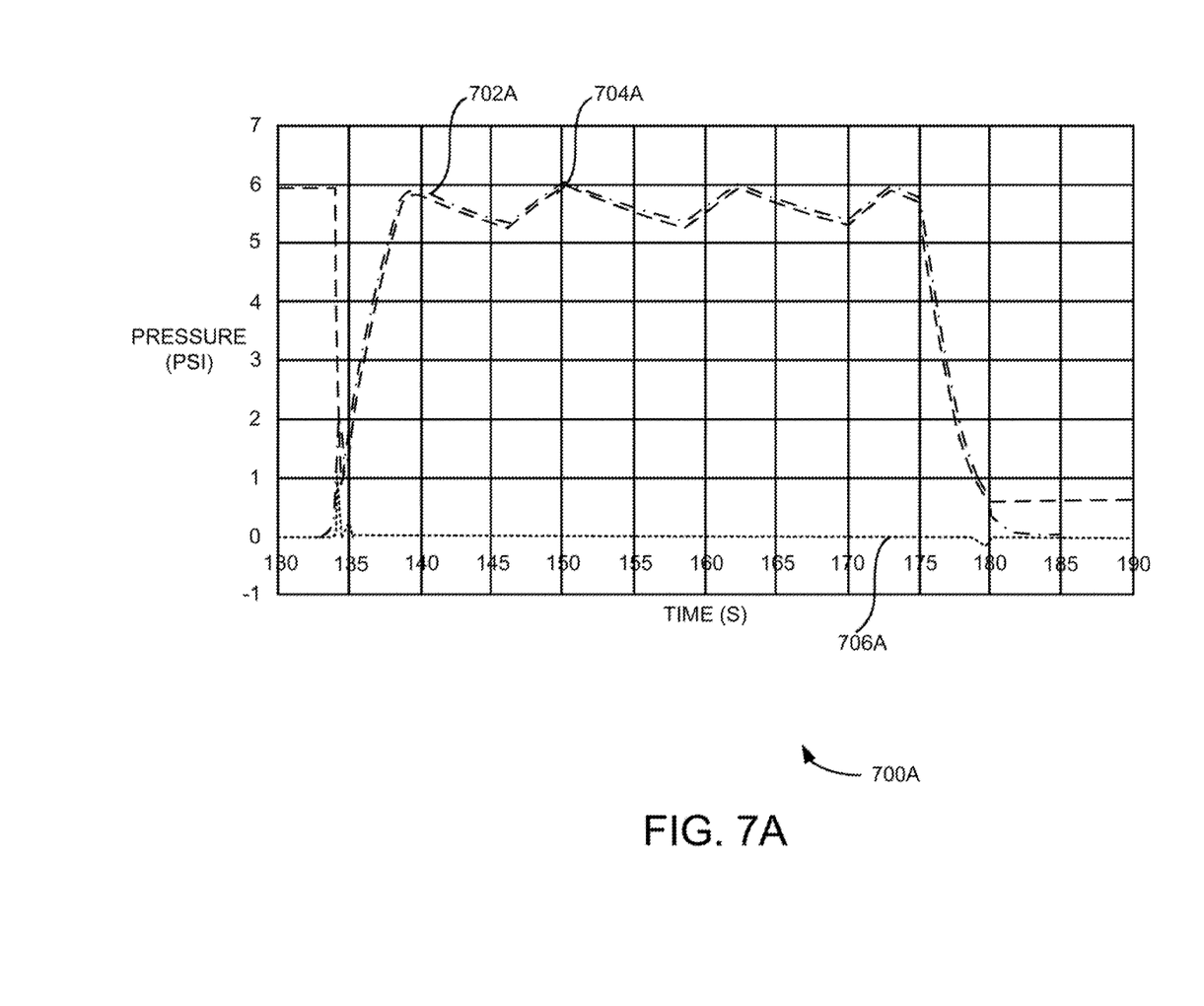
FIGS. 7A and 7B are graphs showing example pressurization cycles when a printing fluid supply cartridge at S2, of FIG. 3, is active and a printing fluid supply cartridge at S1, of FIG. 3, is passive and present in the printing fluid supply system, such as shown in FIG. 1.
Figure 7B:
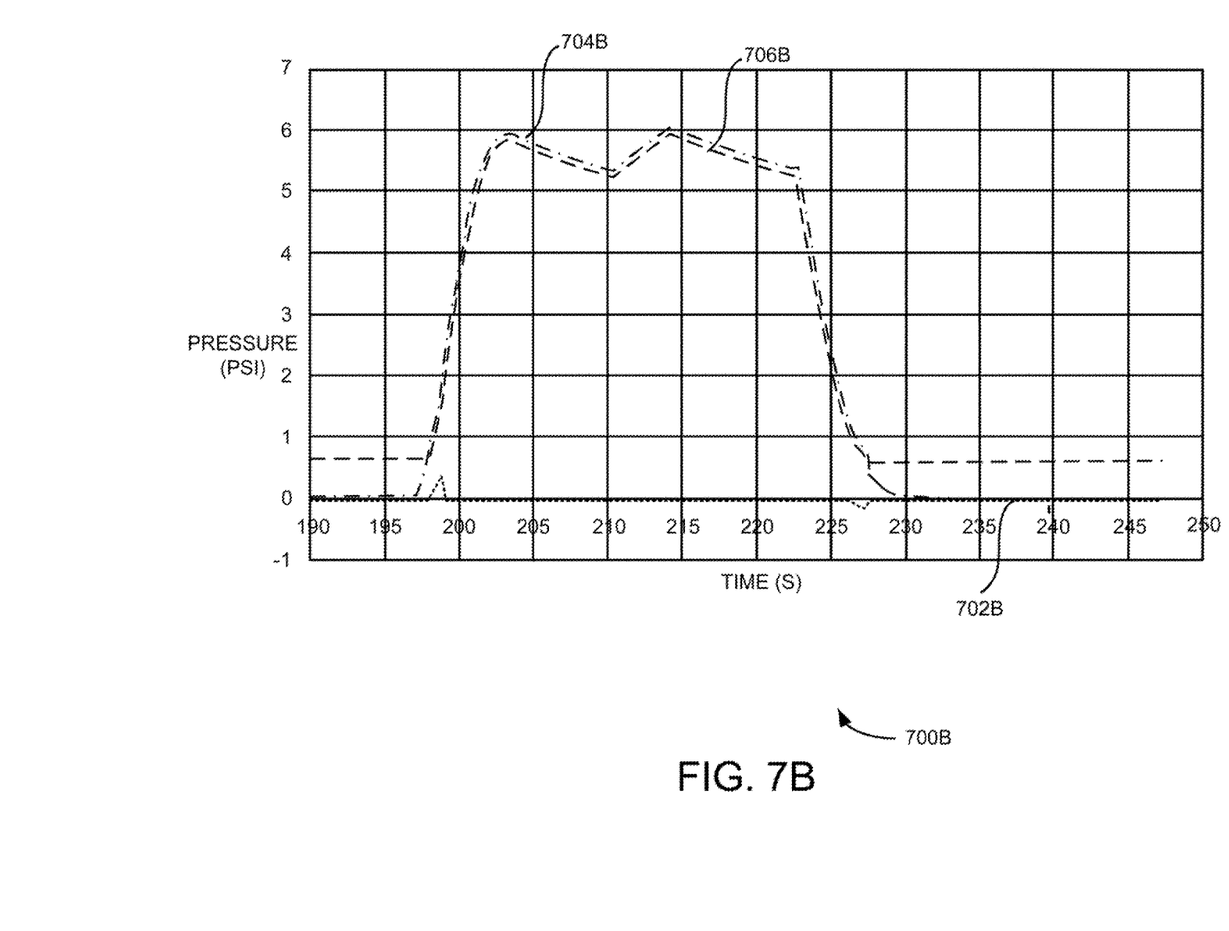

Referring now to FIGS. 7A and 7B, which are graphs showing example pressurization cycles 700A and 700B when a printing fluid supply cartridge at S2 is active or pressurized and a printing fluid supply cartridge at S1 is passive and present in the printing fluid supply system, such as shown in FIG. 1. As shown in FIG. 7A, the x-axis indicates time (s) and the y-axis indicates pressure (psi). In the example pressurization cycle 700A, a curve 702A indicates a pressure curve of P2, a curve 704A indicates a pressure curve of PH and a curve 706A indicates a pressure curve of P1. The pressurization cycle 700A can be used to leave a certain pressure (i.e., residual pressure) at printhead inlet (PH) at certain events during a printer operation (i.e. during replacement of a printhead). When pressurizing S2, there is a certain pressure (i.e., a crack pressure) where the valve gets open and then P4 equalizes to P2. From this point, the pressure at the valve outlet PH follows the pressure in valve inlet S2. In this case, the diaphragm moves until there is a physical barrier (i.e., the top rigid shell). The backflow from S2 to S1 is avoided with the membrane check valve and also with the sealing elements in the S1 side of the diaphragm which works as a second seal. When the system pressure is relief, there is another pressure level P2 where the diaphragm is pushed down by the spring and the sealing element appears at S2 side. At this point, P4 is equal to P2, but remains while P2 keep relieving (i.e., the residual pressure (Pres)). Referring now to FIG. 7B, which a graph showing the example pressurization cycle 700B at S2, the system from the residual pressure. As shown in FIG. 7B, the x-axis indicates time (s) and the y-axis indicates pressure (psi). In the example pressurization cycle 700B, a curve 702B indicates a pressure curve of P1, a curve 704B indicates a pressure curve of P2 and a curve 706B indicates a pressure curve of PH.

Figure 8A:
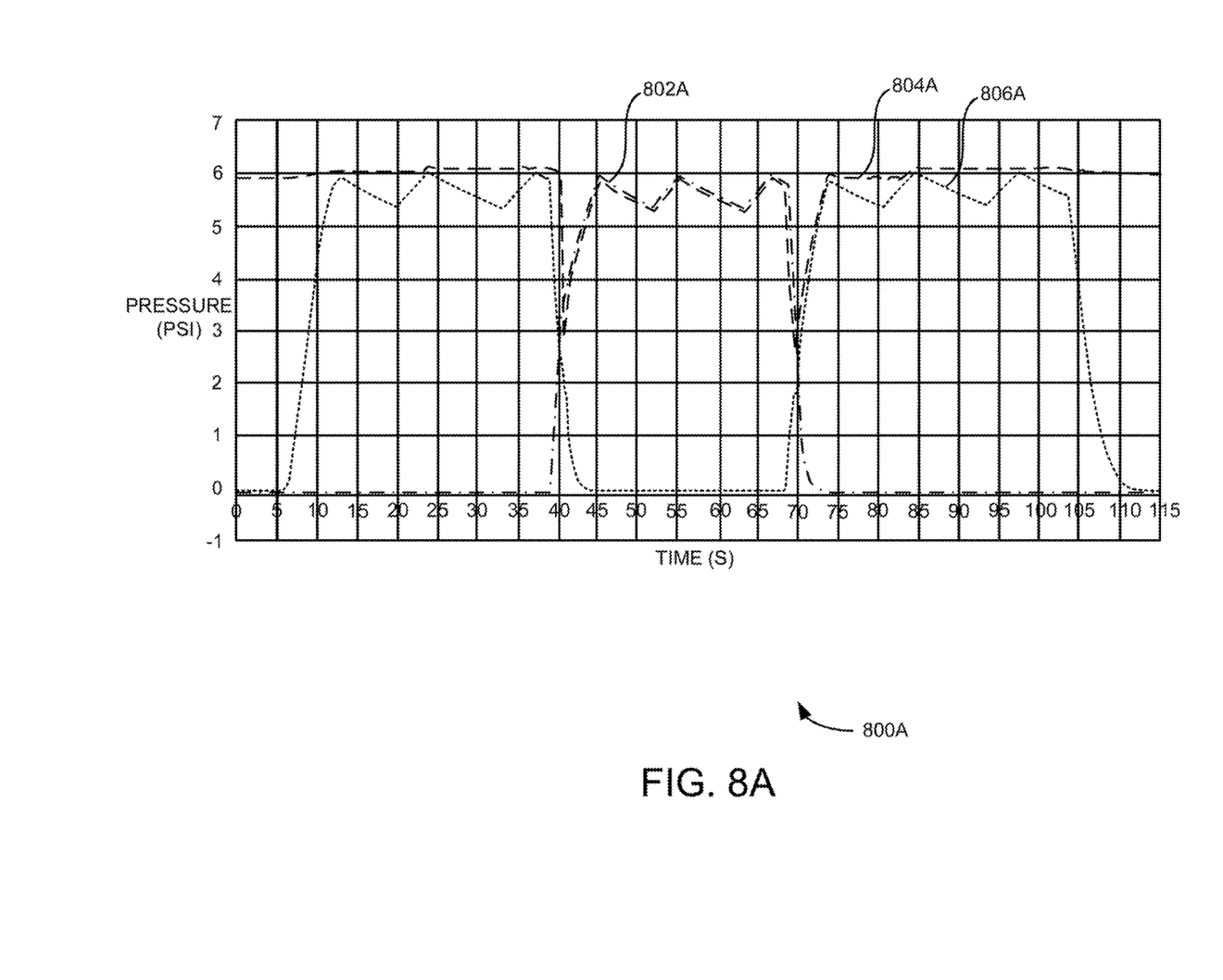
FIG. 8A is a graph showing an example pressurization cycle when there is a pressure transition from the printing fluid supply cartridge at S1 to the printing fluid supply cartridge at S2 and then the printing fluid supply cartridge at S2 to the printing fluid supply cartridge at S1 in the printing fluid supply system, such as shown in FIG. 1.

Referring now to FIG. 8A, which is a graph showing an example pressurization cycle 800A when there is a pressure transition from the printing fluid supply cartridge at S1 to the printing fluid supply cartridge at S2 and then the printing fluid supply cartridge at S2 to the printing fluid supply cartridge at S1 in the printing fluid supply system, such as shown in FIG. 1. Particularly, the graph in FIG. 8A shows a change from the printing fluid supply cartridge at S1 active to the printing fluid supply cartridge at S2 active, then the printing fluid supply cartridge at S2 active to the printing fluid supply cartridge at S1 active and final system depressurization. As shown in FIG. 8A, the x-axis indicates time (s) and the y-axis indicates pressure (psi). In the example pressurization cycle 800A, a curve 802A indicates a pressure curve of P2, a curve 804A indicates a pressure curve of PH and a curve 806A indicates a pressure curve of P1.

Figure 8B:
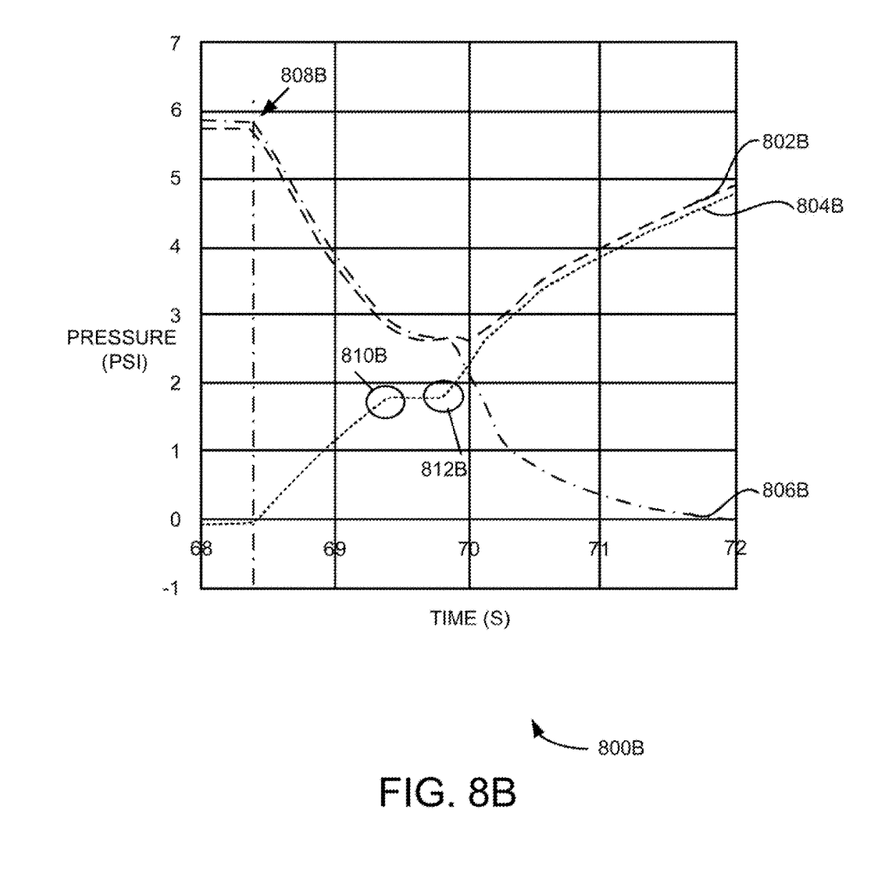
FIG. 8B is a graph showing an example pressurization cycle when there is a pressure transition from the printing fluid supply cartridge at S2 to the printing fluid supply cartridge at S1 in the printing fluid supply system, such as shown in FIG. 1.

Referring now to FIG. 8B, which is a graph showing an example pressurization cycle 800B when there is a pressure transition from the printing fluid supply cartridge at S2 to the printing fluid supply cartridge at S1 in the printing fluid supply system, such as shown in FIG. 1. Particularly, the graph shown in FIG. 8B is a detail graph on transition of pressure from S2 to S1 and a movement of the diaphragm identified in pressure curves. As shown in FIG. 8B, the x-axis indicates time (s) and the y-axis indicates pressure (psi). In the example pressurization cycle 800B, a curve 802B indicates a pressure curve of PH, a curve 804B indicates a pressure curve of P1 and a curve 806B indicates a pressure curve of P2. In this example pressurization cycle 800B, switching of pressurized air between the printing fluid supply cartridges can be observed at a point 808B, the sealing elements at S1 side are opened at a point 810B and the sealing elements at S2 side are closed at a point 812B.

Figure 9:
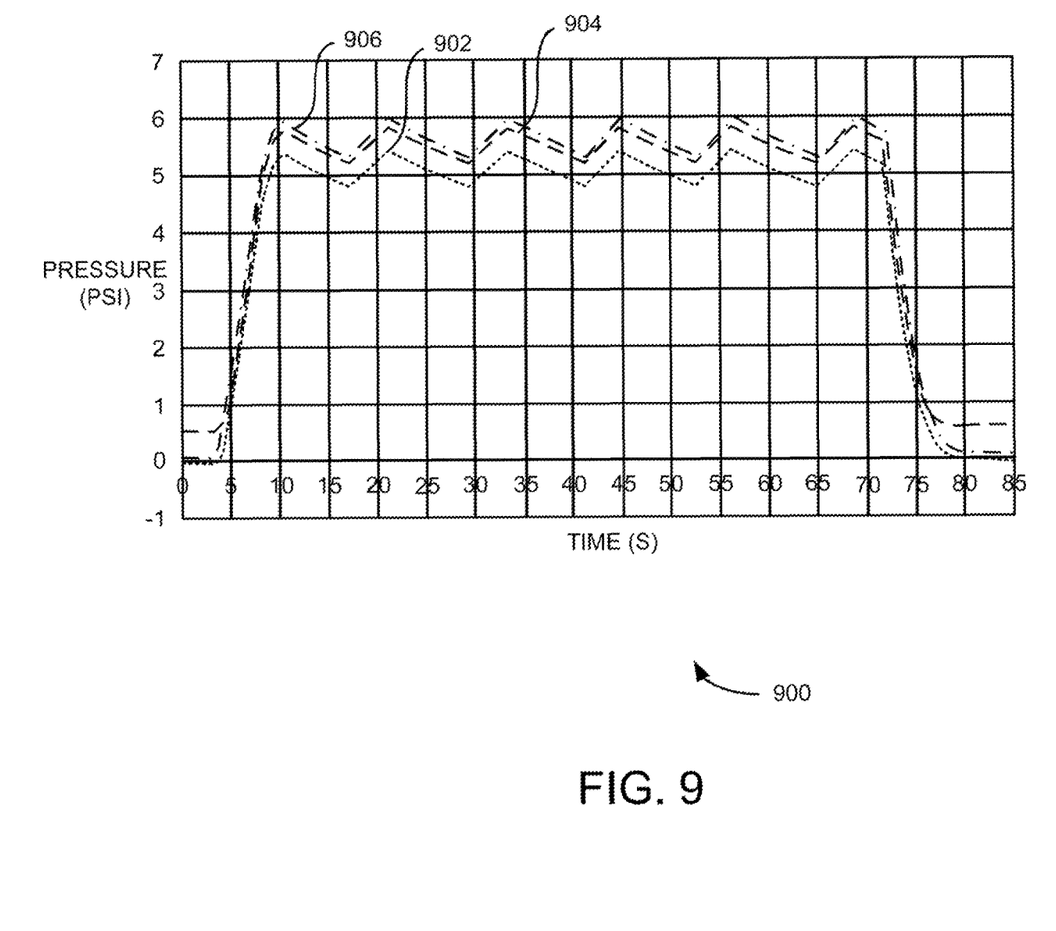
FIG. 9 is a graph showing an example pressurization cycle when the printing fluid supply cartridge at S2 is active and the printing fluid supply cartridge at S1 is not present in the printing fluid supply system, such as shown in FIG. 1.

Referring now to FIG. 9, which is a graph showing an example pressurization cycle 900 when the printing fluid supply cartridge at S2 is active and the printing fluid supply cartridge at S1 is not present in the printing fluid supply system, such as shown in FIG. 1. As shown in FIG. 9, the x-axis indicates time (s) and the y-axis indicates pressure (psi). In the example pressurization cycle 900, a curve 902 indicates a pressure curve of P1, a curve 904 indicates a pressure curve of PH and a curve 906 indicates a pressure curve of P2. It can be observed from the FIG. 9 that P1 follows P2 with a certain energy loss. Also, at the end of the pressurization cycle 900, the system leaves a residual pressure as if the printing fluid supply cartridge at S1 is present.

Figure 10:
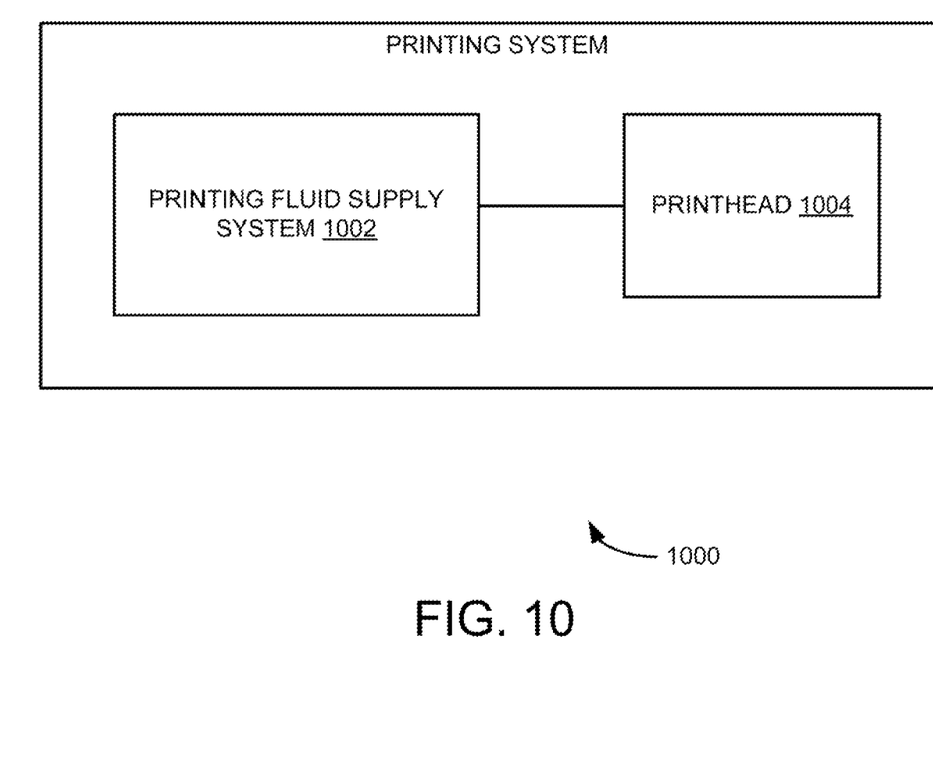
FIG. 10 is a schematic illustration of an example printing system.

Referring now to FIG. 10, which is a schematic illustration of an example printing system 1000. As shown in FIG.

10, the printing system 1000 includes a printing fluid supply system 1002 (e.g., the printing fluid supply system 100 shown in FIG. 1) and a printhead 1004. The printing fluid supply system 1002 is coupled to the printhead 1004 via fluid pipes (e.g., the fluid pipes 110 shown in FIG. 1). During a printing operation, the printing fluid supply system 1002 supplies printing fluid to the printhead 1004 via the fluid pipes. The printhead 1004 includes multiple nozzles to print on a print sheet. This is explained in more detail with reference to FIGS. 1-9.

It may be noted that the above-described examples of the present disclosure is for the purpose of illustration. Although the disclosure has been described in conjunction with a specific example thereof, numerous modifications may be possible without materially departing from the teachings of the subject matter described herein. Other substitutions, modifications and changes may be made without departing from the spirit of the present disclosure. All of the features disclosed in this specification (including any accompanying claims, abstract and drawings), may be combined in any combination, except combinations where some of such features are mutually exclusive.

The invention claimed is:

1. A valve for a printing fluid supply system, the valve comprising:
   a first rigid shell to provide a connection to a first printing fluid supply cartridge;
   a second rigid shell to provide a connection to a second printing fluid supply cartridge and a connection to a printhead; and
   a diaphragm with sealing elements disposed between the first rigid shell and the second rigid shell to selectively couple either one of the first printing fluid supply cartridge and the second printing fluid supply cartridge to the printhead while sealing the other printing fluid supply cartridge using the sealing elements.

2. The valve of claim 1, wherein the first rigid shell and the second rigid shell comprise a top rigid shell and a bottom rigid shell.

3. The valve of claim 1, further comprising:
   a spring for applying a force upon the diaphragm such that the diaphragm seals the either one of the first printing fluid supply cartridge and the second printing fluid supply cartridge using the sealing elements while selectively coupling the other printing fluid supply cartridge to the printhead when the other printing fluid supply cartridge is pressurized.

4. The valve of claim 3, further comprising:
   a third rigid shell that makes interconnections inside the valve; and
   a membrane check valve housed in between the second rigid shell and the third rigid shell to maintain pressure in the connection to the printhead when the either one of the first printing fluid supply cartridge and the second printing fluid supply cartridge is depressurized.

5. The valve of claim 3, wherein the spring further applies a force upon the diaphragm such that the diaphragm seals the other printing fluid supply cartridge using the sealing elements and maintains a residual pressure at the connection to the printhead when the other printing fluid supply cartridge is depressurized.

6. The valve of claim 1, wherein the diaphragm blocks the printing fluid from the other printing fluid supply cartridge using the sealing elements that seal the other printing fluid supply cartridge, wherein the sealing elements are on both sides in a center of the diaphragm.

7. A printing fluid supply system, comprising:
   a first printing fluid supply cartridge;
   a second printing fluid supply cartridge; and
   a valve to selectively couple either one of the first printing fluid supply cartridge and the second printing fluid supply cartridge to a printhead for providing printing fluid, the either one of the first printing fluid supply cartridge and the second printing fluid supply cartridge being pressurized and coupled to the printhead at a time, and the other printing fluid supply cartridge being unpressurized and coupled to a closed end inside the valve, wherein the valve comprises:
      a first rigid shell for providing a connection to the first printing fluid supply cartridge;
      a second rigid shell for providing a connection to the second printing fluid supply cartridge and a connection to the printhead; and
      a diaphragm with sealing elements disposed between the first rigid shell and the second rigid shell for selectively coupling the either one of the first printing fluid supply cartridge and the second printing fluid supply cartridge to the printhead while sealing the other printing fluid supply cartridge using the sealing elements.

8. The printing fluid supply system of claim 7, wherein the first rigid shell and the second rigid shell comprise a top rigid shell and a bottom rigid shell.

9. The printing fluid supply system of claim 7, wherein the valve further comprises:
   a spring for applying a force upon the diaphragm such that the diaphragm seals the either one of the first printing fluid supply cartridge and the second printing fluid supply cartridge using the sealing elements while selectively coupling the other printing fluid supply cartridge to the printhead when the other printing fluid supply cartridge is pressurized.

10. The printing fluid supply system of claim 9, wherein the valve further comprises:
    a third rigid shell that makes interconnections inside the valve; and
    a membrane check valve housed in between the second rigid shell and the third rigid shell to maintain pressure in the connection to the printhead when the either one of the first printing fluid supply cartridge and the second printing fluid supply cartridge is depressurized.

11. The printing fluid supply system of claim 9, wherein the spring further applies a force upon the diaphragm such that the diaphragm seals the other printing fluid supply cartridge using the sealing elements and maintains a residual pressure at the connection to the printhead when the other printing fluid supply cartridge is depressurized.

12. The printing fluid supply system of claim 7, wherein the diaphragm blocks the printing fluid from the other printing fluid supply cartridge using the sealing elements that seal the other printing fluid supply cartridge, wherein the sealing elements are on both sides in a center of the diaphragm.

13. A printing system, comprising:
    a printhead; and
    a valve to selectively couple either one of a first printing fluid supply cartridge and a second printing fluid supply cartridge to the printhead for providing printing fluid, the either one of the first printing fluid supply cartridge and the second printing fluid supply cartridge being pressurized and coupled to the printhead at a time, and the other printing fluid supply cartridge being unpressurized and coupled to a closed end inside the valve, wherein the valve comprises:

a first rigid shell for providing a connection to the first printing fluid supply cartridge;

a second rigid shell for providing a connection to the second printing fluid supply cartridge and a connection to the printhead; and a diaphragm with sealing elements disposed between the first rigid shell and the second rigid shell for selectively coupling the either one of the first printing fluid supply cartridge and the second printing fluid supply cartridge to the printhead while sealing the other printing fluid supply cartridge using the sealing elements.

14. The valve of claim 4, wherein:

the membrane check value is positioned to couple the connection to the printhead to the connection to the first printing fluid supply cartridge when the connection to the first printing fluid supply cartridge is pressurized; and the membrane check value is positioned to couple the connection to the printhead to the connection to the second printing fluid supply cartridge when the connection to the second printing fluid supply cartridge is pressurized.

15. The valve of claim 4, wherein the membrane check valve is uni-directional.

16. The valve of claim 1, wherein the sealing elements are positioned to prevent backflow from the connection to the first printing fluid supply cartridge to the connection to the second printing fluid supply cartridge, and vice versa.

17. The valve of claim 1, wherein the diaphragm is of a shape of a disc.

18. The valve of claim 1, wherein the diaphragm is positioned between the connection to the first printing fluid supply cartridge and the connection to the second printing fluid supply cartridge.

19. The printing fluid supply system of claim 7, wherein the sealing elements are positioned to prevent backflow from the connection to the first printing fluid supply cartridge to the connection to the second printing fluid supply cartridge, and vice versa.

20. The printing system of claim 13, wherein the sealing elements are positioned to prevent backflow from the connection to the first printing fluid supply cartridge to the connection to the second printing fluid supply cartridge, and vice versa.

* * * * *

UNITED STATES PATENT AND TRADEMARK OFFICE
CERTIFICATE OF CORRECTION

PATENT NO. : 10,052,880 B2
APPLICATION NO. : 15/542430
DATED : August 21, 2018
INVENTOR(S) : Alfonso Cameno Salinas et al.

It is certified that error appears in the above-identified patent and that said Letters Patent is hereby corrected as shown below:

In the Drawings

In sheet 4 of 12, FIG. 4, Line 2, delete "ELASTIC MEMBER 404" and insert -- ELASTIC MEMBRANE 404 --, therefor.

Page 1 of 1

Signed and Sealed this
Ninth Day of April, 2019

Andrei Iancu
*Director of the United States Patent and Trademark Office*